(12) United States Patent
Lo et al.

(10) Patent No.: US 9,860,104 B2
(45) Date of Patent: Jan. 2, 2018

(54) QPSK DEMODULATOR

(71) Applicant: National Chiao Tung University, Hsinchu (TW)

(72) Inventors: Chi-Yi Lo, Hsinchu (TW); Hao-Chiao Hong, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 15/272,754

(22) Filed: Sep. 22, 2016

(65) Prior Publication Data

US 2017/0317871 A1    Nov. 2, 2017

(30) Foreign Application Priority Data

Apr. 29, 2016   (TW) .............................. 105113388 A

(51) Int. Cl.
| | |
|---|---|
| *H04B 1/38* | (2015.01) |
| *H04B 7/212* | (2006.01) |
| *H04L 27/38* | (2006.01) |
| *H04L 27/26* | (2006.01) |

(52) U.S. Cl.
CPC ...... *H04L 27/3881* (2013.01); *H04L 27/2602* (2013.01)

(58) Field of Classification Search
CPC ...... H04L 27/18; H04L 27/2602; H01P 1/201; H01P 11/007; H01P 1/2016; H01P 5/16; H01P 1/00
USPC .............................. 370/321; 375/222; 455/17
See application file for complete search history.

(56) References Cited

U.S. PATENT DOCUMENTS

| | | | | |
|---|---|---|---|---|
| 5,196,846 | A | * 3/1993 | Brockelsby | B61L 25/04 340/10.51 |
| 5,955,987 | A | * 9/1999 | Murphy | G01S 19/215 342/16 |
| 6,046,630 | A | * 4/2000 | Kim | H04L 27/2331 329/304 |
| 6,205,340 | B1 | * 3/2001 | Yandrofski | H04B 1/16 455/117 |
| 6,904,266 | B1 | * 6/2005 | Jin | H04B 7/15571 370/279 |
| 2001/0030612 | A1 | * 10/2001 | Kerber | G08B 5/36 340/12.22 |
| 2003/0030473 | A1 | * 2/2003 | Lee | G11C 7/22 327/158 |
| 2004/0008286 | A1 | * 1/2004 | Markman | H04L 25/03834 348/725 |

(Continued)

*Primary Examiner* — Daniel Washburn
*Assistant Examiner* — Sarah Hassan
(74) *Attorney, Agent, or Firm* — Muncy, Geissler, Olds & Lowe, P.C.

(57) ABSTRACT

A novel quadrature phase-shift keying (QPSK) demodulator, called the bowknot quadrature phase-shift keying (BQPSK) demodulator, is disclosed. The BQPSK demodulator uses a delay circuit to delay a BQPSK signal and mixes the delayed BQPSK signal with the undelayed BQPSK signal to output an I-channel data signal and a Q-channel data signal. The BQPSK demodulator further uses a phase rotation circuit to demodulate the orthogonal data signals and obtain a recovery clock signal. The BQPSK demodulator neither uses an A/D converter nor uses a quadrature oscillator, featuring high data rate, low power consumption, simple architecture and superior reliability. The BQPSK demodulator can be realized by digital circuits and analog circuits.

18 Claims, 16 Drawing Sheets

(56) References Cited

U.S. PATENT DOCUMENTS

| | | | |
|---|---|---|---|
| 2005/0285701 A1* | 12/2005 | Kayano | H01P 1/20381 333/204 |
| 2006/0084402 A1* | 4/2006 | Oshima | H04B 1/1027 455/232.1 |
| 2006/0256844 A1* | 11/2006 | Shimizu | H04B 1/71637 375/152 |
| 2007/0080835 A1* | 4/2007 | Maeda | H03D 3/009 341/120 |
| 2011/0204987 A1* | 8/2011 | Olsson | H04L 27/0008 332/104 |

* cited by examiner

QPSK DEMODULATOR

BACKGROUND OF THE INVENTION

1. Field of the Invention

The present invention relates to a novel quadrature phase-shift keying (QPSK) demodulator, particularly to a low-power consumption QPSK demodulator.

2. Description of the Prior Art

The conventional QPSK demodulator uses an analog-to-digital (A/D) converter to convert a QPSK signal into a digital signal and uses a baseband signal processor to recover the data and clock. The customers demand higher and higher operation speed of electronic products. However, high-speed A/D converters and high-speed digital-to-analog (D/A) converter consume much power, and the design thereof is very difficult. The most popular QPSK demodulator nowadays is based on the Costas loop, which excludes a high-power consumption D/A converter and includes two parallel phase-locked loops, i.e. the I-branch and the Q-branch. There is a 90-degree phase difference between the I-branch and the Q-branch, which is normally formed via using an oscillator to generate a clock signal having a doubled carrier frequency and using quadrature signal generators to generate two signals having the same frequency and 90-degree phase difference. The oscillator operating at the doubled carrier frequency, consuming more power. The conventional QPSK demodulator has the following disadvantages: 1. high power consumption, 2. limited data rate, 3. complicated circuit, 4. larger size.

Some products need receivers or batteryless devices, which strictly demand low power consumption and low heat generation, such as embedded biomedicine chips, environmental monitor systems, and Internet of things. These devices need a low-power consumption and small-area demodulator to receive data. However, the conventional demodulator consumes too high a proportion of the total power consumed by the entire system and thus cannot satisfy the abovementioned requirement.

Therefore, a low-power consumption QPSK demodulator is a target the industry is eager to achieve.

SUMMARY OF THE INVENTION

The conventional QPSK demodulator uses a clock signal whose frequency is higher than the frequency of the carrier wave to sample the QPSK signal and obtain the demodulated IQ data. However, an oscillator generating a high-frequency clock not only increases circuit complexity but also raises power consumption. The present invention proposes a novel QPSK demodulator (also called the bowknot QPSK (BQPSK) demodulator), which uses a simplified phase transition state to lower the complexity of demodulation.

Refer to FIG. 1 to compare constellation views of a typical QPSK signal, a common offset QPSK (OQPSK) signal, and a BQPSK signal. The QPSK modulated signal has 12 phase transition states and 4 phase repetition states. In an OQPSK modulated signal, 4 phase transitions are removed, such as the transition path between 0° and 180° and the transition path between 90° and 270°. In a BQPSK modulated signal, 4 phase transitions are removed, such as the transition path between 0° and 270° and the transition path between 90° and 180°.

The present invention provides a BQPSK demodulator, which uses a delay circuit to delay a BQPSK signal and mixes the delayed signal with the undelayed BQPSK signal to output a set of I-channel data signal and Q-channel data signal. The BQPSK demodulator of the present invention has the advantages of high data rate, low power consumption, simple structure and high reliability. Further, the BQPSK demodulator of the present invention can be realized by digital circuits and analog circuits.

In one embodiment, the BQPSK demodulator of the present invention comprises a delay circuit and a decision-making circuit. The delay circuit receives a BQPSK signal, delaying the BQPSK signal by a first delay time to output a first delayed signal, and delaying the BQPSK signal by a total delay time to output a second delayed signal or an opposite-phase second delayed signal, wherein the opposite-phase second delayed signal is an opposite-phase signal of the second delayed signal. The decision-making circuit is electrically connected with the delay circuit, mixing the BQPSK signal and the second delayed signal (or the opposite-phase second delayed signal) to generate a first heterodyne signal. According to the first heterodyne signal, the decision-making circuit samples the BQPSK signal to output the I-channel data signal of the BQPSK signal. The decision-making circuit also mixes the BQPSK signal and the first delayed signal to generate a second heterodyne signal. The decision-making circuit further samples the second heterodyne signal according to the first heterodyne signal to output the Q-channel data signal of the BQPSK signal, wherein the first delay time and the total delay time meets following relationships: $0.125T \leq TD1 \leq 0.375T$, $0.375T < TD < 0.625T$, $0.125T \leq TD-TD1 < 0.5T$, wherein TD is the total delay time, TD1 is the first delay time, and T is a period of a carrier wave of the BQPSK signal.

Below, embodiments are described in detail in cooperation with the attached drawings to make easily understood the objectives, technical contents, characteristics and accomplishments of the present invention.

DESCRIPTION OF THE PREFERRED EMBODIMENTS

Figure 1:
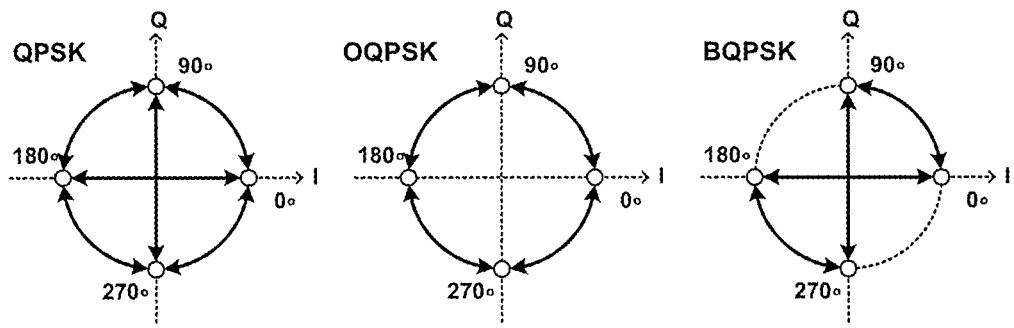
FIG. 1 is a diagram schematically showing the constellation views of a QPSK signal, an offset OQPSK signal, and a BQPSK signal.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Figure 2:
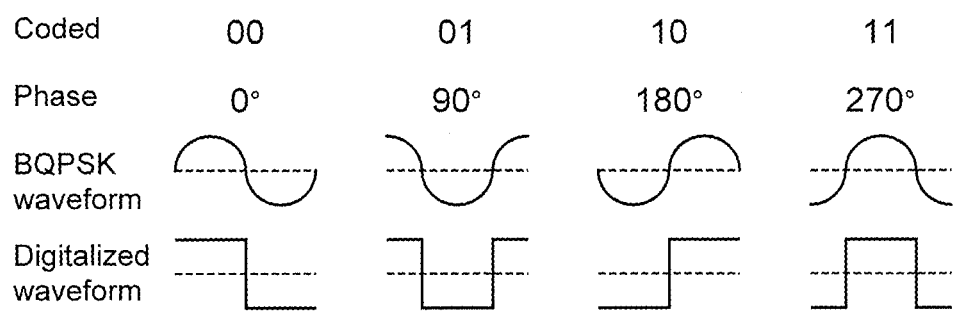
FIG. 2 is a diagram schematically showing the timing chart of the waveforms of a BQPSK signal.

The BQPSK demodulator of the present invention functions to recognize 4 phases having 90-degree phase differences in the input modulated signal and output the data codes respectively represented by the phases. Refer to FIG. 2 for the exemplification of modulation phases, which are respectively denoted by "00", "01", "10", and "11" in sequence from left to right, corresponding to the modulation phases 0°, 90°, 180°, and 270° of the BQPSK signal. T is the period of the carrier wave of the BQPSK signal. However, the present invention does not limit that the period of the carrier wave of the BQPSK signal must be T. The relationship between the codes and the phases of the input modulated signal is only for exemplification. The present invention does not limit that the codes and the phases must obey the abovementioned relationship.

Figure 3:
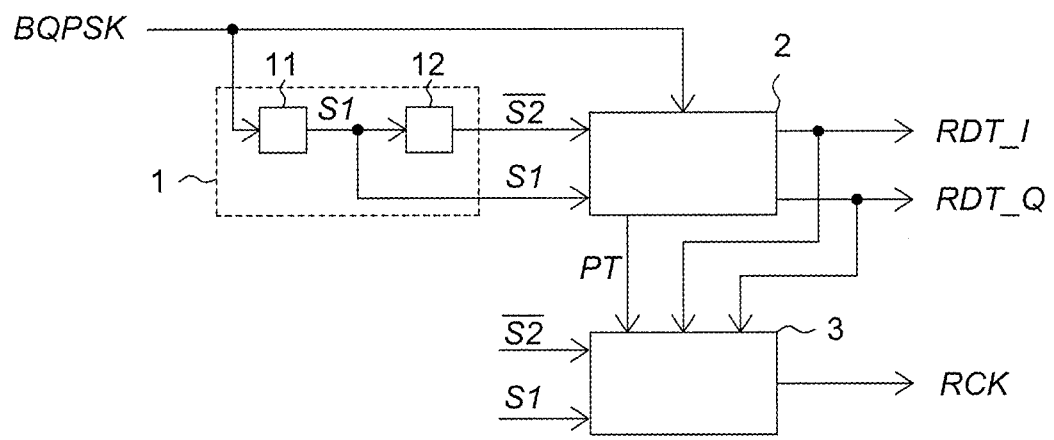
FIG. 3 is a diagram schematically showing a BQPSK demodulator according to one embodiment of the present invention.

Refer to FIGS. 3-6. A raw data signal DT is modulated into a BQPSK signal, and the BQPSK signal is sent to a BQPSK demodulator. Refer to FIG. 3. In one embodiment, the BQPSK demodulator comprises a delay circuit 1, a decision-making circuit 2 and a phase rotation circuit 3. The delay circuit 1 includes a first delay element 11 and a second delay element 12. However, the present invention does not limit that the delay circuit 1 only includes the first delay element 11 and the second delay unit 12. The first delay element 11 receives the BQPSK signal and delays the BQPSK signal by a first delay time TD1 to output a first delayed signal S1. The second delay element 12 receives the first delayed signal S1 and delays the first delayed signal S1 by a second delay time TD2 to generate a second delayed signal S2 and output an opposite-phase second delayed signal $\overline{S2}$ to the decision-making circuit 2. The opposite-phase second delayed signal $\overline{S2}$ is an opposite-phase signal of the second delayed signal S2. The first delay time TD1 and the second delay time TD2 satisfy the following relationships: TD=TD1+TD2, $0.125T \leq TD1 \leq 0.375T$, $0.125T \leq TD2 \leq 0.5T$; $0.375T < TD < 0.625T$, wherein TD is a total delay time, and T is the period of the carrier wave of the BQPSK signal. The details thereof will be described thereinafter.

Figure 4:
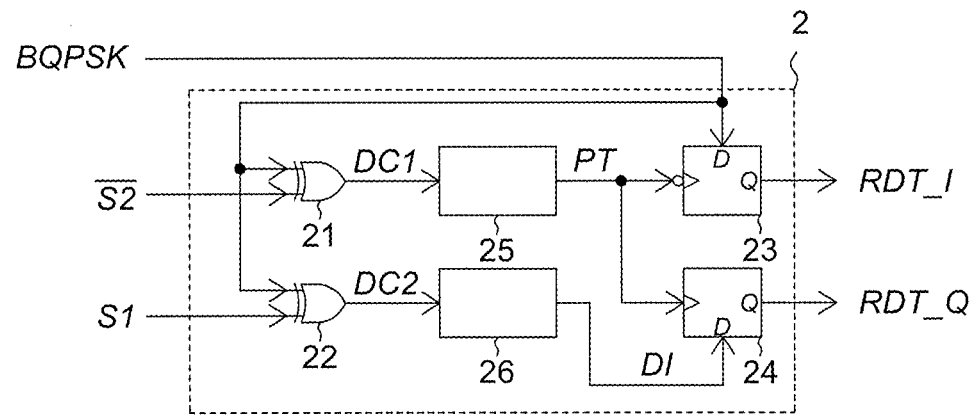
FIG. 4 is a diagram schematically showing a decision-making circuit according to one embodiment of the present invention.

Refer to FIG. 3 and FIG. 4. The decision-making circuit 2 includes a first XOR gate 21, a second XOR gate 22, a first flip-flop 23, a second flip-flop 24, a first hazard-remover 25, and a second hazard-remover 26. The first XOR gate 21 is electrically connected with the second delay element 12, mixing the BQPSK signal and the opposite-phase second delayed signal $\overline{S2}$ to output a first heterodyne signal DC1. The first hazard-remover 25 is electrically connected with the first XOR gate 21, eliminating the positive hazards of the first heterodyne signal DC1 and outputting a phase transition signal PT. The first flip-flop 23 is electrically connected with the first hazard-remover 25, sampling the BQPSK signal according to the phase transition signal PT and outputting the I-channel data signal RDT_I of the BQPSK signal.

In some embodiments, the first flip-flop 23 is a rising edge triggered flip-flop or a falling edge triggered flip-flop according to the practical circuit design, whereby to extract the correct I-channel data signal RDT_I. A substitute design of the falling edge flip-flop is the cooperation of the rising edge flip-flop and an inverter disposed at one of the two input ends of the first XOR gate 21 or the output end of the XOR gate 21. However, the present invention is not limited by the abovementioned design. The persons having ordinary knowledge in the field should be able to modify or vary the abovementioned design to make the flip-flop of the decision-making circuit operate normally.

The second XOR gate 22 is electrically connected with the first delay element 11, mixing the first delayed signal S1 and the BQPSK signal and outputting a second heterodyne signal DC2. The second hazard-remover 26 is electrically connected with the second XOR gate 22, eliminating the negative hazards of the second heterodyne signal DC2 and outputting a data information signal DI. The second flip-flop 24 is electrically connected with the second hazard-remover 26, sampling the data information signal DI according to the first heterodyne signal DC1 and outputting the Q-channel data signal RDT_Q of the BQPSK signal. Similarly, the second flip-flop 24 is a rising edge triggered flip-flop or a falling edge triggered flip-flop according to the practical circuit design, whereby to extract the correct Q-channel data signal RDT_Q.

In one embodiment, the first hazard-remover 25 is used to filter out positive hazards, and the second hazard-remover 26 is used to filter out negative hazards. In this embodiment, the positive pulse with a width less than 0.125T is regarded as a positive hazard; a negative pulse with a width less than 0.125T is regarded as a negative hazard.

Figure 6:
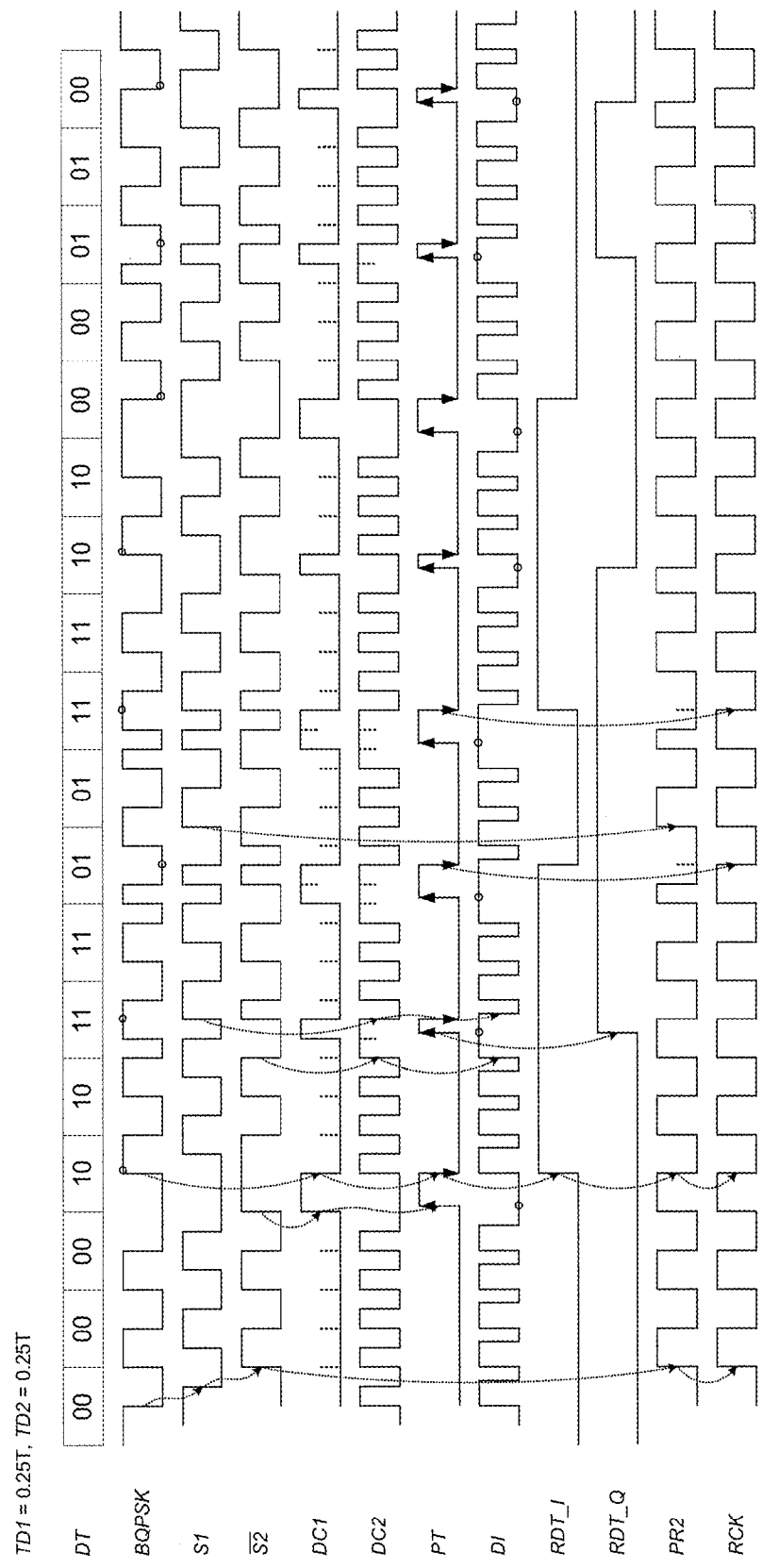
FIG. 6 is a diagram schematically showing the timing charts of a BQPSK demodulator according to one embodiment of the present invention.

Refer to FIG. 6. The circlets on the waveform of the BQPSK signal denote the logic values sampled by the phase transition signal PT, i.e. the I-channel data signal RDT_I. The circlets on the waveform of the data information signal DI denotes the logic values sampled by the phase transition signal PT, i.e. the Q-channel data signal RDT_Q. Refer to FIG. 3 and FIG. 6. Via comparison, it is found: the I-channel data signal RDT_I and the Q-channel data signal RDT_Q recovered by the BQPSK demodulator are identical to those of the raw data signal DT.

It should be noted: the characteristics described in the abovementioned embodiments are selective and may be utilized in different designs and applications of the circuits. The persons having ordinary knowledge in the field should be able to recognize the modifications, substitutions and variations of these characteristics. For example, a common circuit structure is intrinsically able to resist high-frequency hazards and likely to be exempted from the affection of high-frequency hazards; therefore, a decision-making circuit free of hazard-removers can also operate normally in a stable operation environment. In some embodiments, the design of the decision-making circuit involves the first hazard-remover 25 and the second hazard-remover 26 to enhance the hazard-filtering effect of the decision-making circuit. However, the present invention is not limited by the abovementioned design.

Below is described the working principle of the BQPSK demodulator of the present invention. Refer to FIG. 6 again. Firstly, delay a BQPSK signal to output a first delayed signal S1 and an opposite-phase second delayed signal $\overline{S2}$. Next, mix the BQPSK signal and the opposite-phase second delayed signal $\overline{S2}$ to check whether the phase transition of logic states of the BQPSK signal takes place. If the phase transition of logic states of the BQPSK signal takes place, a corresponding pulse signal is generated in the phase transition signal PT. Next, use the phase transition signal PT to extract the I-channel data signal RDT_I from the BQPSK signal. Next, mix the BQPSK signal and the first delayed signal S1 to output an orthogonal data characteristic DI. Then, use the phase transition signal PT to extract the Q-channel data signal RDT_Q from the orthogonal data characteristic. If no pulse occurs in the phase transition signal PT, it means that no phase transition takes places in the modulated data. In such a case, the BQPSK demodulator only needs to output the same data.

Refer to FIG. 2 again. The leftmost BQPSK signal coded "00" is used as the exemplification. Suppose that the logic state of the BQPSK signal is "0" during the interval from the time point of T/2 to the time point of 3T/4. Thus, the logic state of the I-channel data signal RDT_I output by the BQPSK demodulator is also "0". If the logic state of the BQPSK signal does not change during the interval from the time point of 0 to the time point of T/2, the logic state of the Q-channel data signal RDT_Q output by the BQPSK demodulator is "0". Next, the rightmost BQPSK signal coded "11" is used as the exemplification. Suppose that the logic state of the BQPSK signal is "1" during the interval from the time point of T/2 to the time point of 3T/4. Thus, the logic state of the I-channel data signal RDT_I output by the BQPSK demodulator is also "1". If the logic state of the BQPSK signal changes during the interval from the time point of 0 to the time point of T/2, i.e. the logic state of the BQPSK signal shifts from "0" to "1", the logic state of the Q-channel data signal RDT_Q output by the BQPSK demodulator is "1". The principle of the demodulation of the other BQPSK signals is similar to that described above and will not repeat herein.

Figure 7:
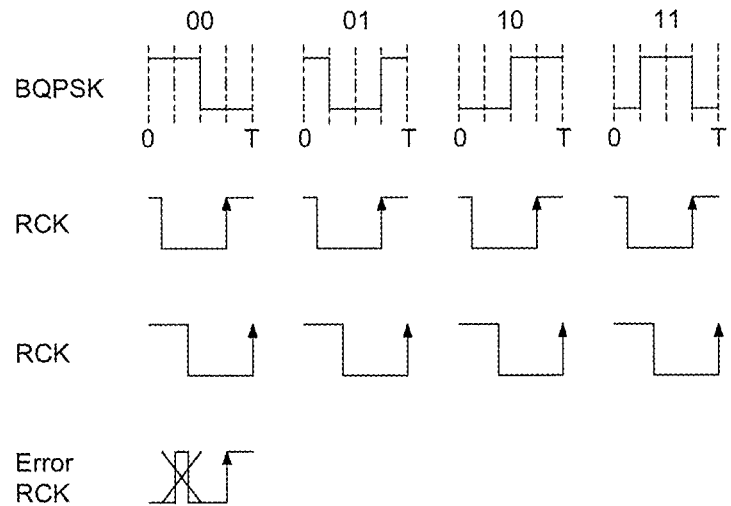
FIG. 7 is a diagram schematically showing the timing charts of a recovery clock signal according to one embodiment of the present invention.

In addition to a pair of I-channel data signal and Q-channel data signal, the BQPSK demodulator of the present invention also outputs a recovery clock signal functioning as the working clock of the other electronic elements in the system and enabling the baseband circuit to extract correct data. Refer to FIG. 7. The average period of the recovery clock signal RCK is the same as the period T of the carrier wave of the BQPSK signal. In other words, the BQPSK demodulator only undertakes sampling once to generate a rising edge of the clock signal during the time interval of the period T of the carrier wave of the BQPSK signal. In one embodiment, the BQPSK demodulator generates a rising edge of the recovery clock signal at the time point of 3T/4. In another embodiment, the BQPSK demodulator generates a rising edge of the recovery clock signal at the time point of 4T/4. It is easily understood: a hazard-remover may be cascaded to the rear end of the phase rotation circuit to prevent from that an additional hazard appearing during the same period of the carrier wave causes the state of the recovery clock signal RCK to change more than one time.

Below is described how the BQPSK demodulator undertakes demodulation and generates a recovery clock signal. Refer to FIG. 3. The phase rotation circuit 3 is electrically connected with the delay circuit 1 and the decision-making circuit 2. According to the I-channel data signal and the Q-channel data signal output by the decision-making circuit 2, the phase rotation circuit 3 undertakes the computation of at least two of the first delayed signal S1, the opposite-phase second delayed signal $\overline{S2}$, and the BQPSK signal to output a phase clock signal PRCK. The phase clock signal PRCK is used as the recovery clock signal RCK. In one embodiment, a hazard-remover is used to eliminate the hazards of the phase clock signal PRCK and output a recovery clock signal RCK. However, the present invention is not limited by the abovementioned embodiments.

Figure 5:
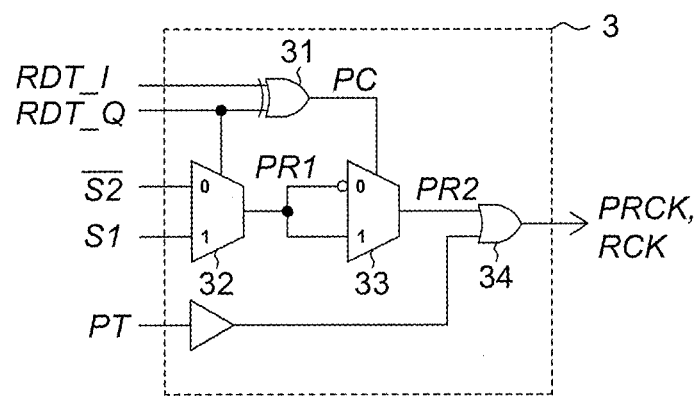
FIG. 5 is a diagram schematically showing a phase rotation circuit according to one embodiment of the present invention.

Refer to FIG. 5 and FIG. 6. The phase rotation circuit 3 includes a third XOR gate 31, a first multiplexer 32, a second multiplexer 33, and an OR gate 34. The third XOR gate 31 is electrically connected with the decision-making circuit 2, receiving the I-channel data signal RDT_I and the Q-channel data signal RDT_Q and undertaking an XOR operation to output a phase control signal PC. The first multiplexer 32 is electrically connected with the delay circuit 1 and the decision-making circuit 2, processing the first delayed signal S1 or the opposite-phase second delayed signal $\overline{S2}$, which is output by the delay circuit 1, to output a first procession signal PR1 according to logic state of the Q-channel data signal RDT_Q, which is output by the decision-making circuit 2. The second multiplexer 33 is electrically connected with the third XOR gate 31 and the first multiplexer 32, reversing the phase of the first procession signal PR1, which is output by the first multiplexer 32, to output a second procession signal PR2 according to the logic state of the phase control signal PC, which is output by the third XOR gate 31. The OR gate 34 is electrically connected with the second multiplexer 33 and the decision-making circuit 2, receiving the second procession signal PR2 and the phase transition signal PT and undertaking an OR operation to output a phase clock signal PRCK. The phase clock signal PRCK is used as the recovery clock signal RCK. In one embodiment, a hazard-remover is used to eliminate the hazards of the phase clock signal PRCK and output a recovery clock signal RCK. However, the present invention is not limited by the abovementioned embodiments. It should be noted: a working clock signal whose rising edges have a stable period is sufficient to satisfy ordinary electronic elements. As shown in FIG. 6, both the rising edges and the falling edges of the recovery clock signal RCK have stable periods. Therefore, the recovery clock signal RCK can provide a working clock signal for high-end circuit designs, such as the Double-Data-Rate Two Synchronous Dynamic Random Access Memory (DDR2 SDRAM), which needs to transmit data at rising edges and falling edges.

Figure 8:
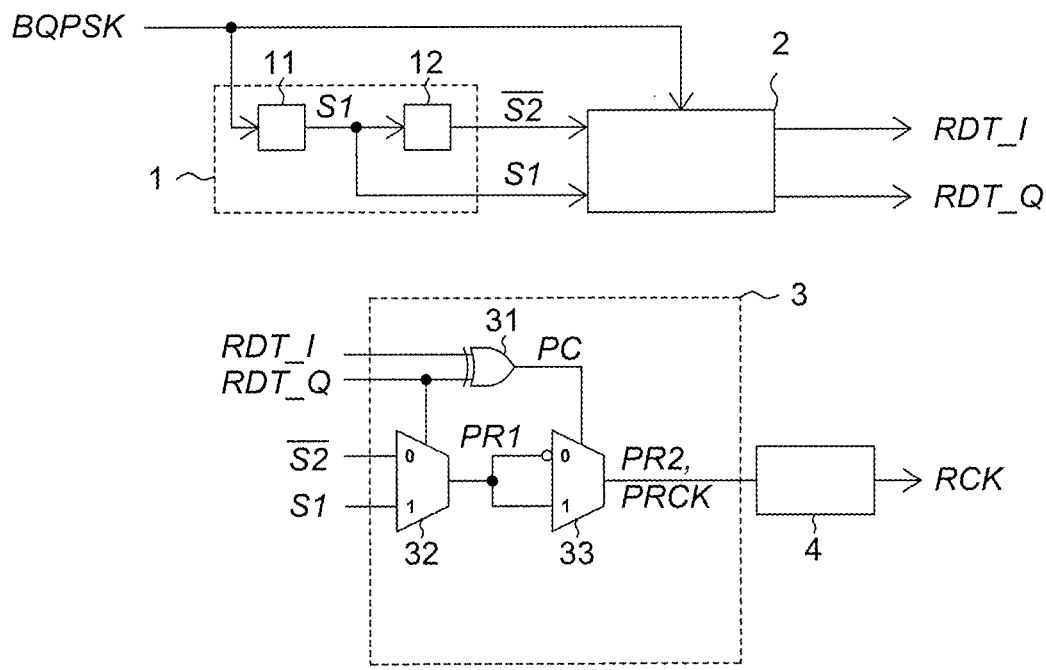
FIG. 8 is a diagram schematically showing a BQPSK demodulator according to another embodiment of the present invention.
Figure 9:
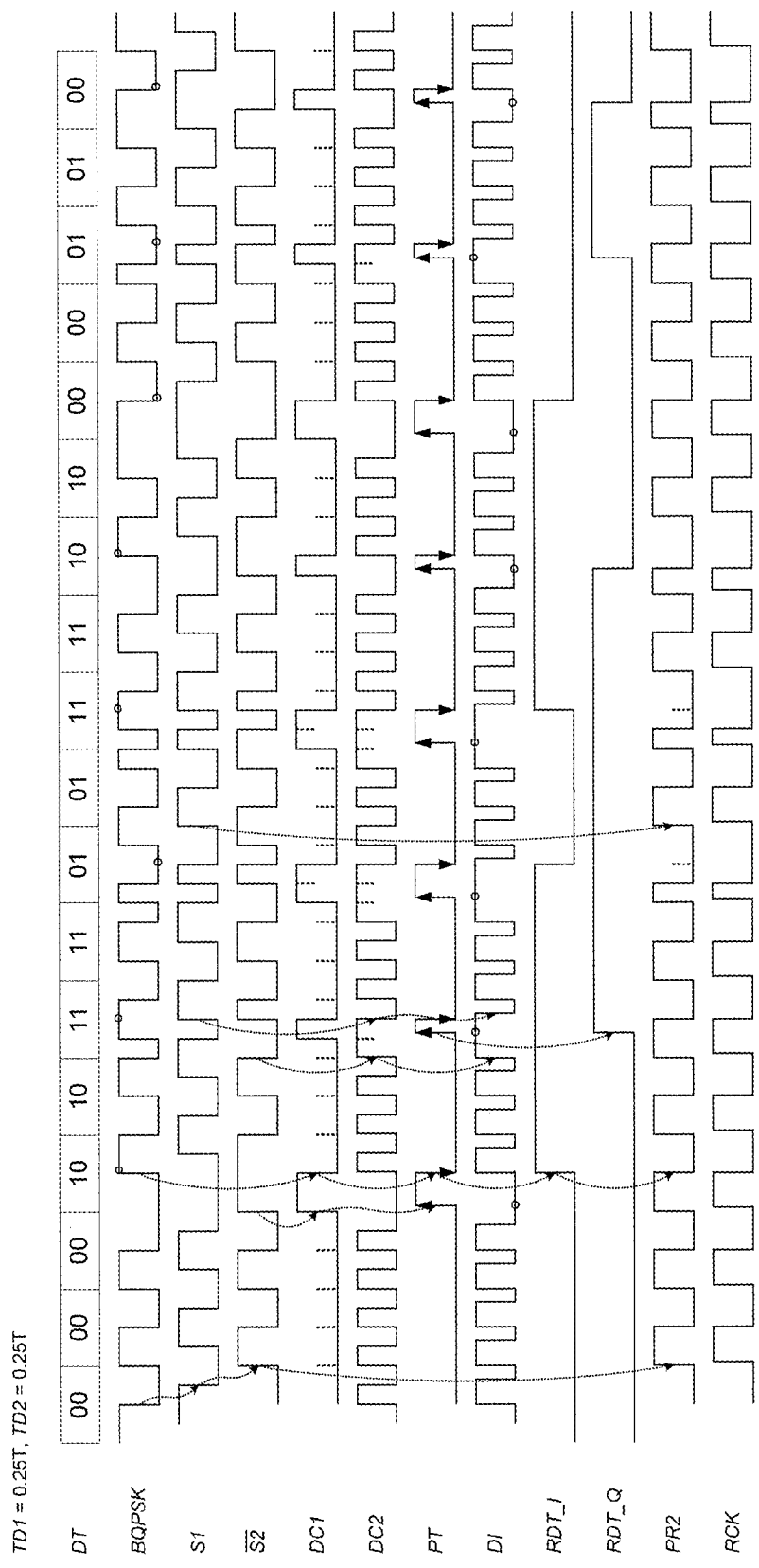
FIG. 9 is a diagram schematically showing the timing charts of a BQPSK demodulator according to another embodiment of the present invention.

Refer to FIG. 8 and FIG. 9 for another embodiment. The connection and working principle of the delay circuit 1, the decision-making circuit 2 and the phase rotation circuit 3 in FIG. 8 has been described above and will not repeat herein. In FIG. 8, the phase rotation circuit 3 includes a third XOR gate 31, a first multiplexer 32, and a second multiplexer 33. The third XOR gate 31 is electrically connected with the decision-making circuit 2, receiving the I-channel data signal RDT_I and the Q-channel data signal RDT_Q and undertaking an XOR operation to output a phase control signal PC. The first multiplexer 32 is electrically connected with the delay circuit 1 and the decision-making circuit 2, processing the first delayed signal S1 or the opposite-phase second delayed signal $\overline{S2}$, which is output by the delay circuit 1, to output a first procession signal PR1 according to the logic state of the Q-channel data signal RDT_Q, which is output by the decision-making circuit 2. The second multiplexer 33 is electrically connected with the third XOR gate 31 and the first multiplexer 32, reversing the phase of the first procession signal PR1, which is output by the first multiplexer 32, to output a second procession signal PR2 according to the logic state of the phase control signal PC, which is output by the third XOR gate 31. The second procession signal PR2 is exactly the phase clock signal PRCK output by the phase rotation circuit 3. In a preferred embodiment, a third hazard-remover 4 is cascaded to the output terminal of the phase rotation circuit 3, eliminating the hazards of the phase clock signal PRCK to output the recovery clock signal RCK. As shown in FIG. 9, the rising edges of the recovery clock signal RCK have a stable period, enabling the baseband circuit to extract correct data.

Figure 10:
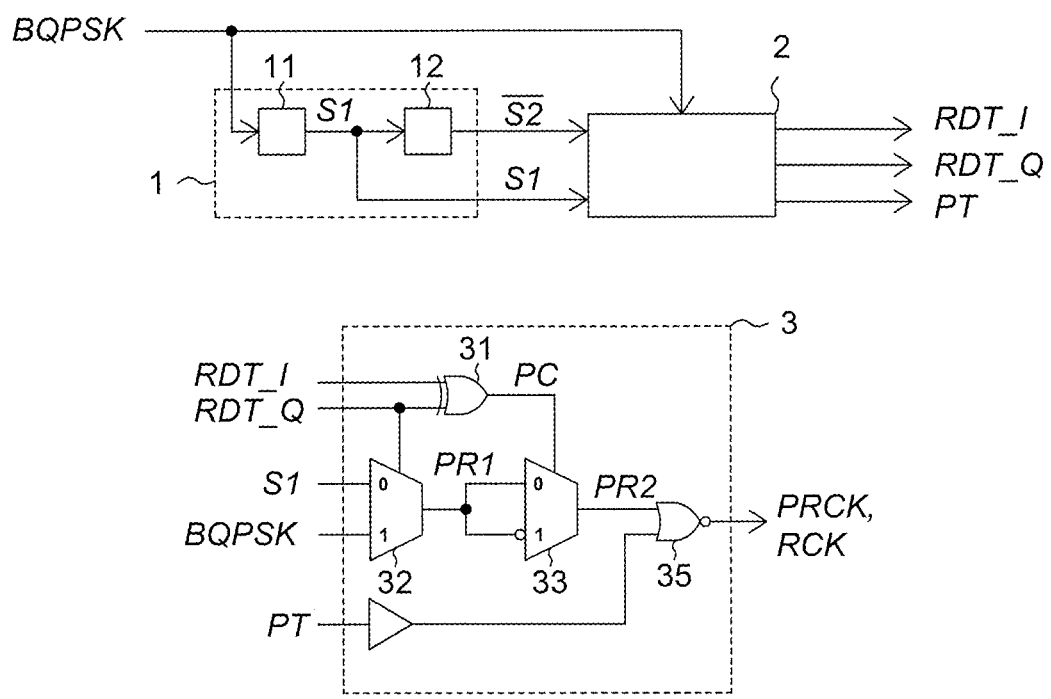
FIG. 10 is a diagram schematically showing a BQPSK demodulator according to yet another embodiment of the present invention.
Figure 11:
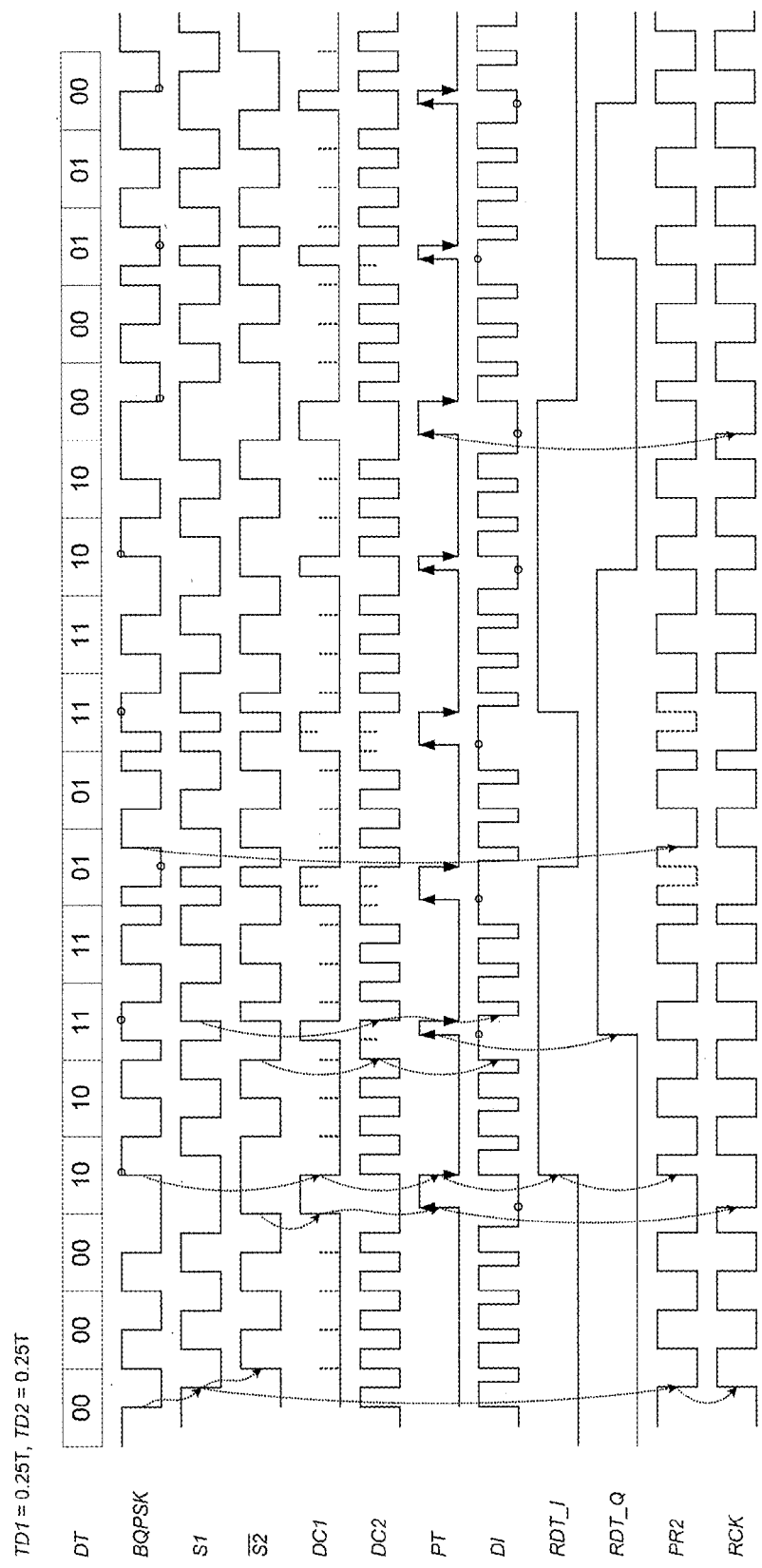
FIG. 11 is a diagram schematically showing the timing charts of a BQPSK demodulator according to yet another embodiment of the present invention.

Refer to FIG. 10 and FIG. 11 for yet another embodiment. The connection and working principle of the delay circuit 1, the decision-making circuit 2 and the phase rotation circuit 3 in FIG. 9 has been described above and will not repeat herein. In FIG. 10, the phase rotation circuit 3 includes a third XOR gate 31, a first multiplexer 32, and a second multiplexer 33, and an NOR gate 35. The third XOR gate 31 is electrically connected with the decision-making circuit 2, receiving the I-channel data signal RDT_I and the Q-channel data signal RDT_Q and undertaking an XOR operation to output a phase control signal PC. The first multiplexer 32 is electrically connected with the delay circuit 1 and the decision-making circuit 2, processing the BQPSK signal or the first delayed signal S1, which is output by the delay circuit 1, to output a first procession signal PR1 according to the logic state of the Q-channel data signal RDT_Q, which is output by the decision-making circuit 2. The second multiplexer 33 is electrically connected with the third XOR gate 31 and the first multiplexer 32, reversing the phase of the first procession signal PR1, which is output by the first multiplexer 32, to output a second procession signal PR2 according to the logic state of the phase control signal PC, which is output by the third XOR gate 31. The NOR gate 35 is electrically connected with the second multiplexer 33 and the decision-making circuit 2, receiving the second procession signal PR2 and the phase transition signal PT and undertaking an NOR operation to output a phase clock signal PRCK. The phase clock signal PRCK is used as the recovery clock signal RCK. In one embodiment, a hazard-remover is used to eliminate the hazards of the phase clock signal PRCK and output a recovery clock signal RCK. However, the present invention is not limited by the abovementioned embodiments. As shown in FIG. 11, the rising edges of the recovery clock signal RCK have a stable period, enabling the baseband circuit to extract correct data.

The persons having ordinary knowledge in the field should be able to recognize the modifications, substitutions and variations of the present invention. For example, the abovementioned first or second multiplexer can be replaced by an XOR gate, an analog multiplier, a mixer, or a Gilbert cell. However, the present invention is not limited by the abovementioned example.

It should be noted: the characteristics described in the abovementioned embodiments are selective and may be utilized in different designs and applications of the circuits. Although these characteristics are respectively mentioned in different embodiments, they can be used separately or jointly, such as the phase rotation circuit 3 in FIG. 3, the first hazard-remover 25 and the second hazard-remover 26 in FIG. 4, and the third hazard-remover 4 in FIG. 8.

In summary, the BQPSK demodulator of the present invention is characterized in using a delay circuit (i.e. a delay line) to delay a BQPSK signal, and mixing the delayed BQPSK signal and the undelayed BQPSK signal to acquire a pair of I-channel data signal and Q-channel data signal, and using a phase rotation circuit to output a recovery clock signal according to the pair of I-channel data signal and Q-channel data signal.

Figure 12:
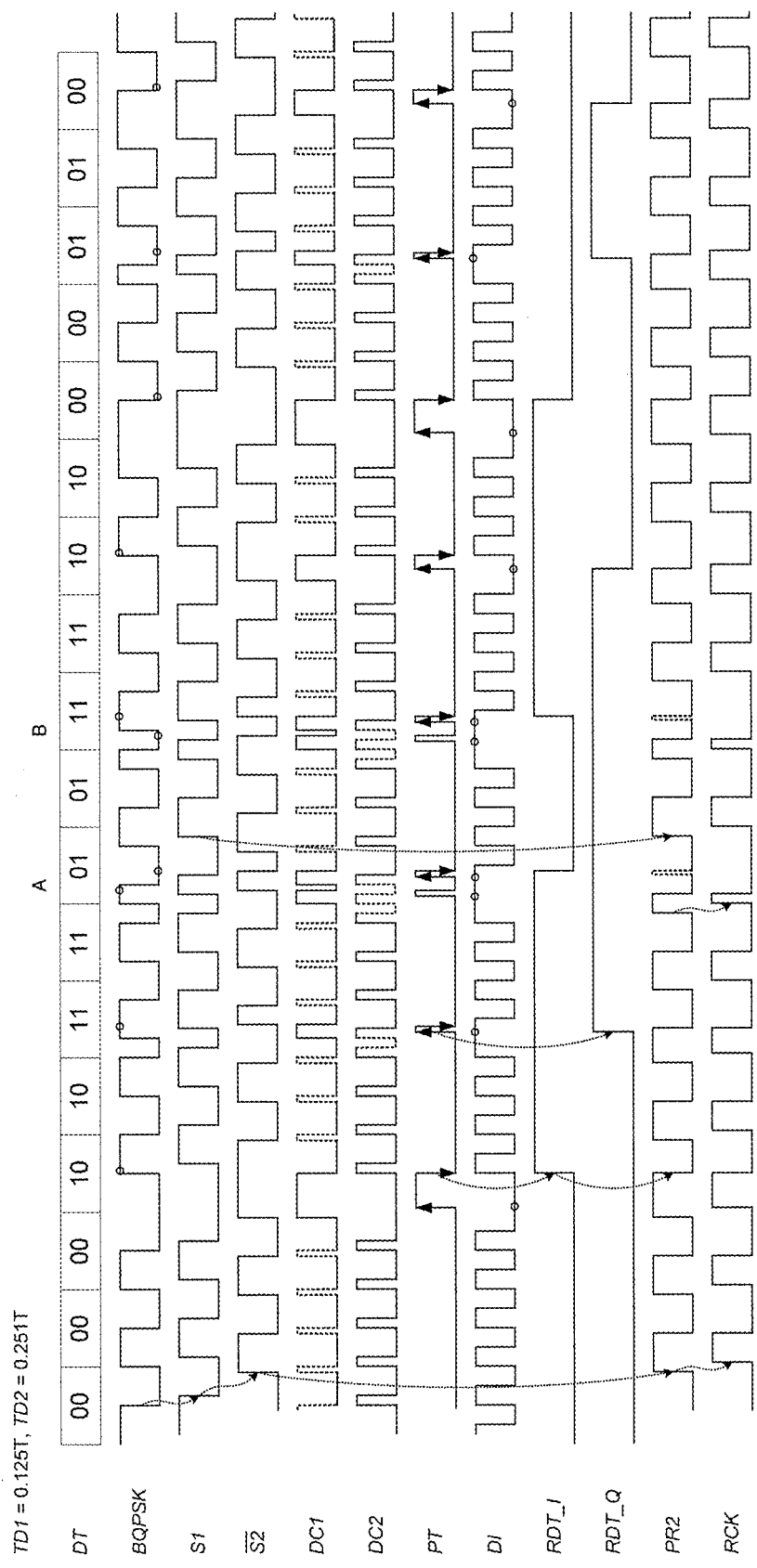
FIG. 12 is a diagram schematically showing the timing charts of a BQPSK demodulator according to one embodiment of the present invention.
Figure 13:
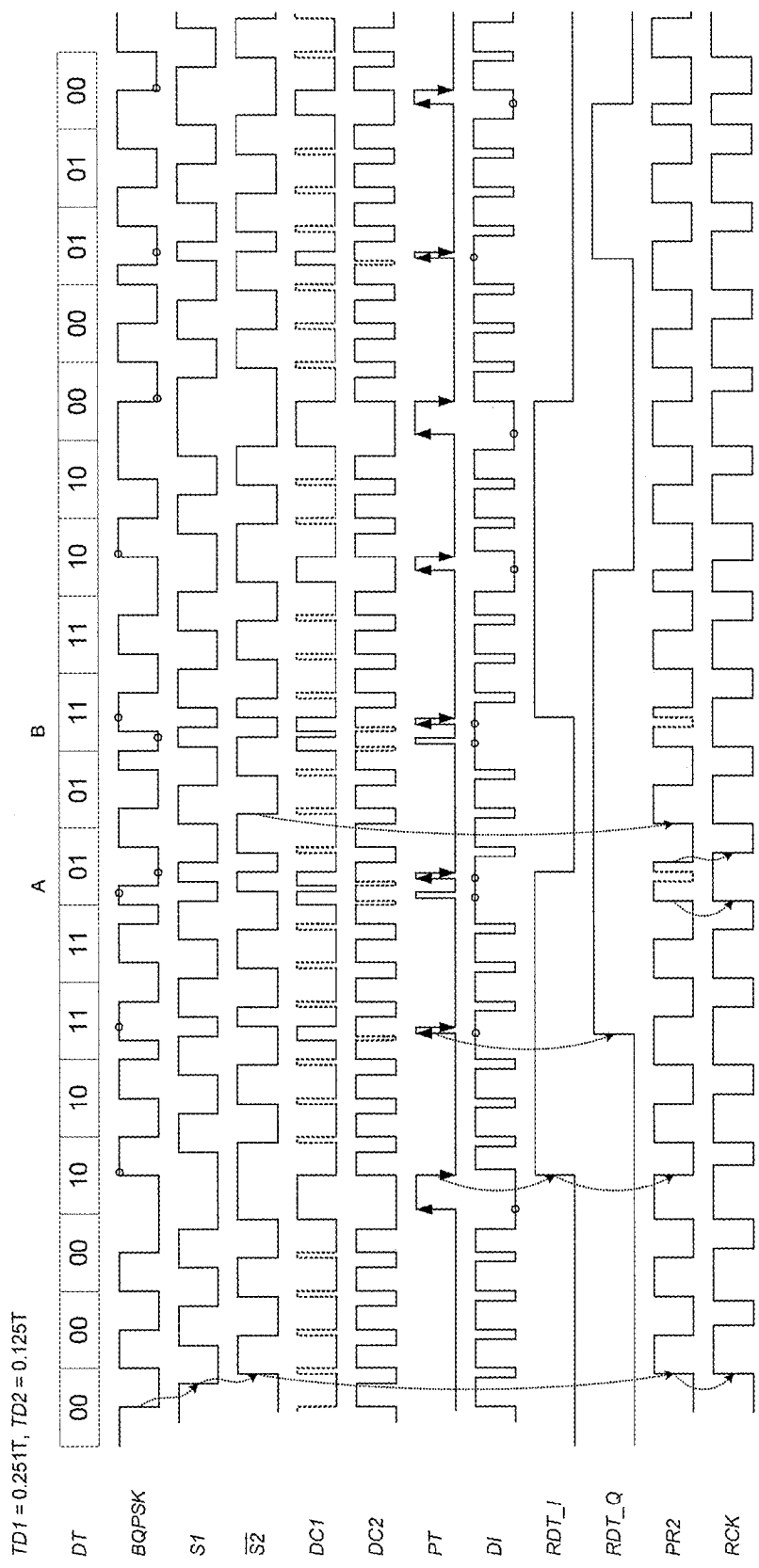
FIG. 13 is a diagram schematically showing the timing charts of a BQPSK demodulator according to one embodiment of the present invention.

Refer to FIG. 8. The embodiment shown in FIG. 8 will be used to demonstrate that the BQPSK demodulator can work in the specified ranges of the delay time: $TD=TD1+TD2$, $0.125T \leq TD1 \leq 0.375T$, $0.125T \leq TD2 < 0.5T$, and $0.375T < TD1+TD2 < 0.625T$, wherein TD1 is the first delay time, TD2 the second delay time, TD the total delay time, and T the period of the carrier wave of the BQPSK signal. Refer to FIG. 12 and FIG. 13, wherein $TD=0.376T$, which meets the condition $0.375T < TD$. Refer to FIG. 12, wherein the first delay time is equal to the lower limit thereof, i.e. $TD1=0.125T$, and wherein $TD2=0.251T$. Refer to FIG. 13, wherein the second delay time is equal to the lower limit thereof, i.e. $TD2=0.125T$, and wherein $TD1=0.251T$. From the timing charts shown in FIG. 12 and FIG. 13, it is learned: the I-channel data signal RDT_I and the Q-channel data signal RDT_Q recovered by the BQPSK demodulator is identical to the raw data DT.

Figure 14:
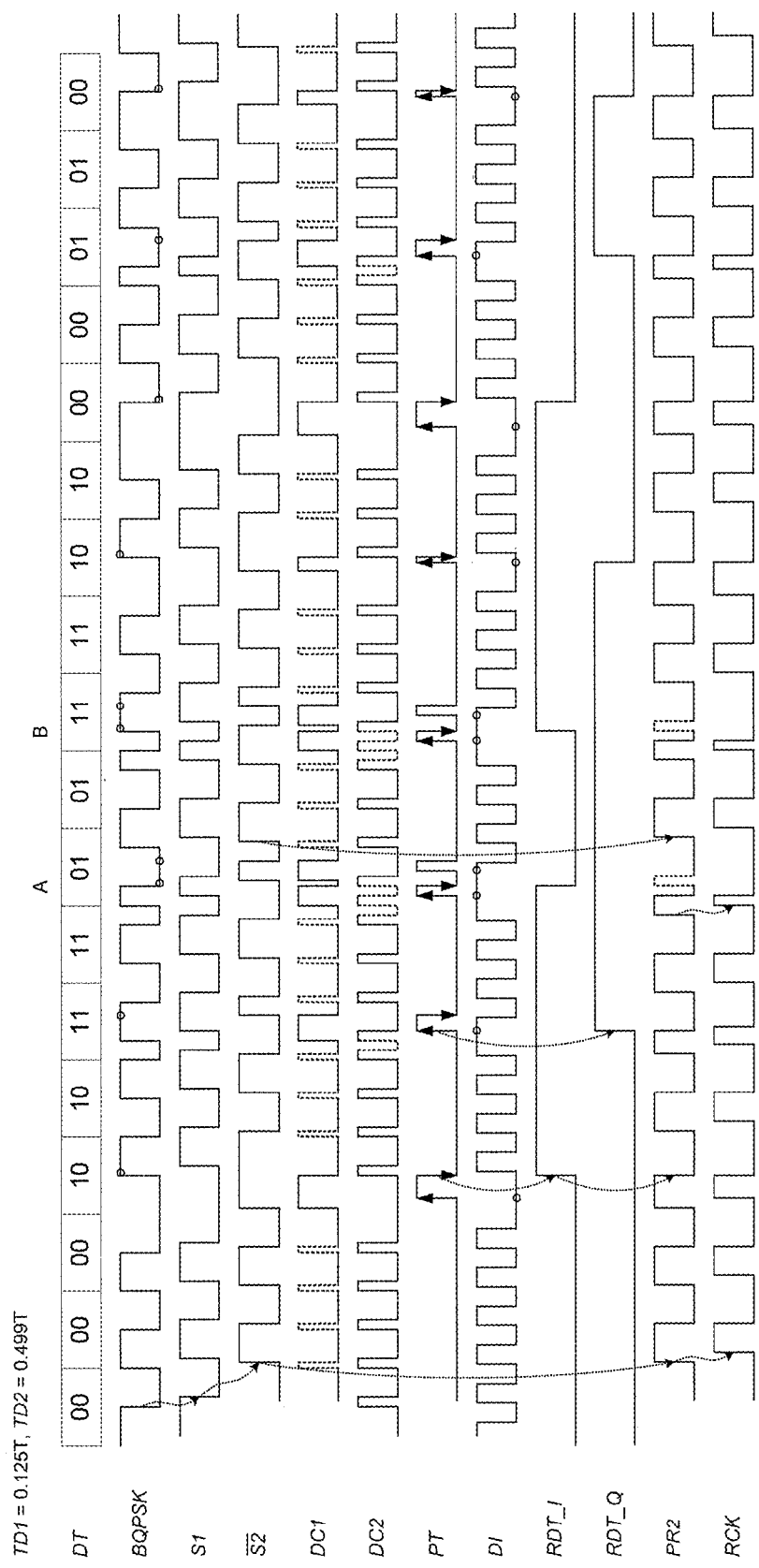
FIG. 14 is a diagram schematically showing the timing charts of a BQPSK demodulator according to one embodiment of the present invention.
Figure 15:
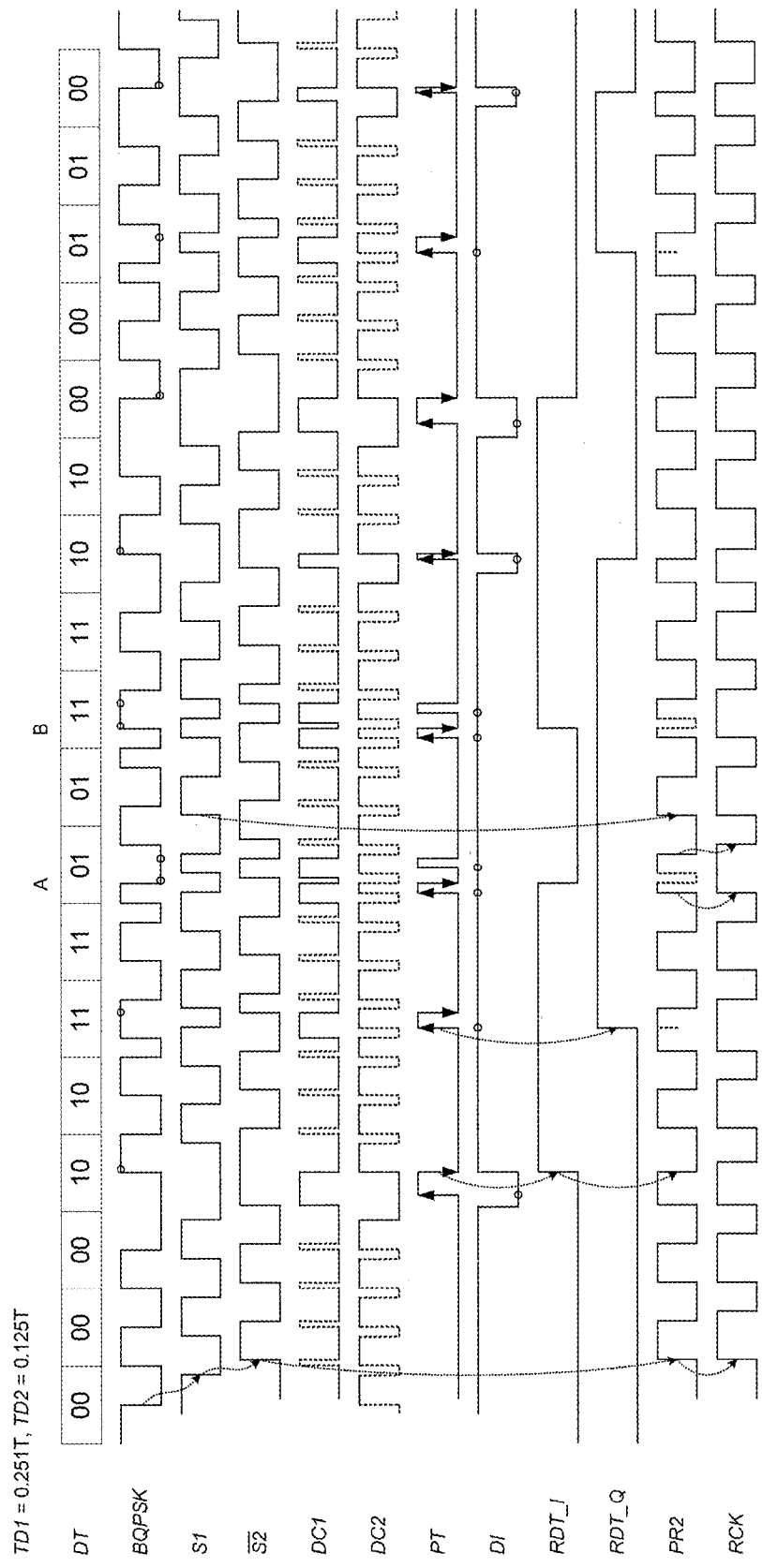
FIG. 15 is a diagram schematically showing the timing charts of a BQPSK demodulator according to one embodiment of the present invention.

Refer to FIG. 14 and FIG. 15, wherein $TD=0.624T$, which meets the condition $TD<0.625T$. Refer to FIG. 14, wherein the first delay time is equal to the lower limit thereof, i.e.

TD1=0.125T, and wherein TD2=0.499T, which approaches the upper limit thereof. Refer to FIG. 15, wherein the first delay time is equal to the upper limit thereof, i.e. TD1=0.375T, and wherein TD2=0.249T. From the timing charts shown in FIG. 14 and FIG. 15, it is learned: the I-channel data signal RDT_I and the Q-channel data signal RDT_Q recovered by the BQPSK demodulator is identical to the raw data DT. It should be explained: the phase transition signal generally generates a pulse signal in each period of the carrier wave; in some extreme cases, such as Period A and period B in FIGS. 12-15, the phase transition signal generates two pulse signals in an identical period; however, only one of the pulse signals is used to acquire the change of data. In FIG. 12 and FIG. 13, the second pulse signal is used to acquire the change of data. In FIG. 14 and FIG. 15, the first pulse signal is used to acquire the change of data. The difference in the timings to acquire data in the abovementioned cases is owing to that the intrinsic factors of the circuits of the BQPSK demodulators slightly vary the delay time thereof.

In one embodiment, the first delay time and the second delay time of the delay circuit of the BQPSK demodulator are locked by a delay-locked loop (DLL), and the delay circuit of the BQPSK demodulator is used as the delay line of DLL.

Figure 16:
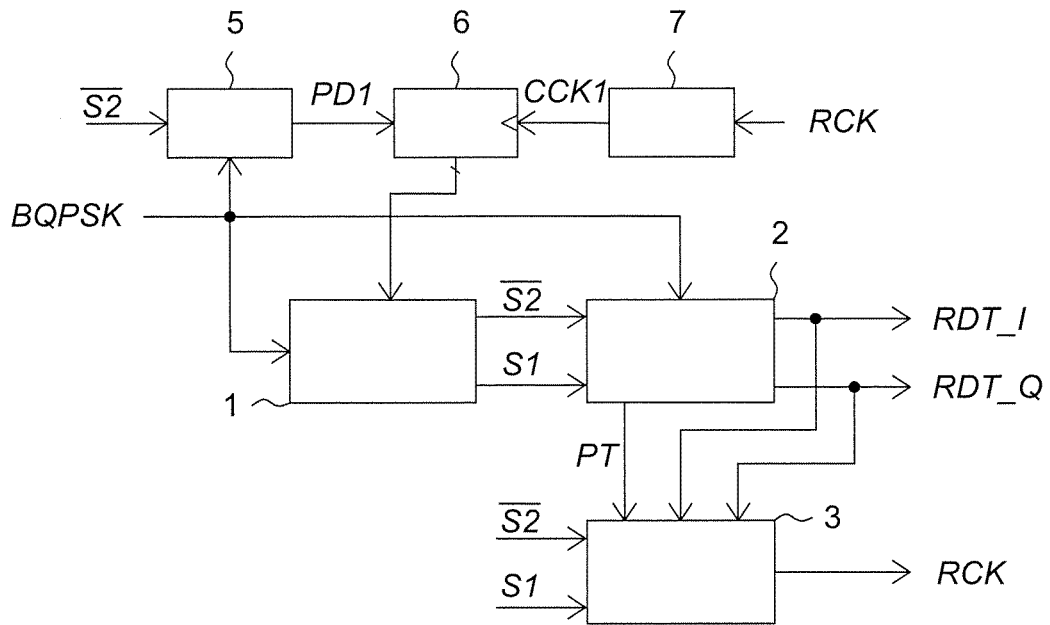
FIG. 16 is a diagram schematically showing a BQPSK demodulator according to still another embodiment of the present invention.
Figure 17:
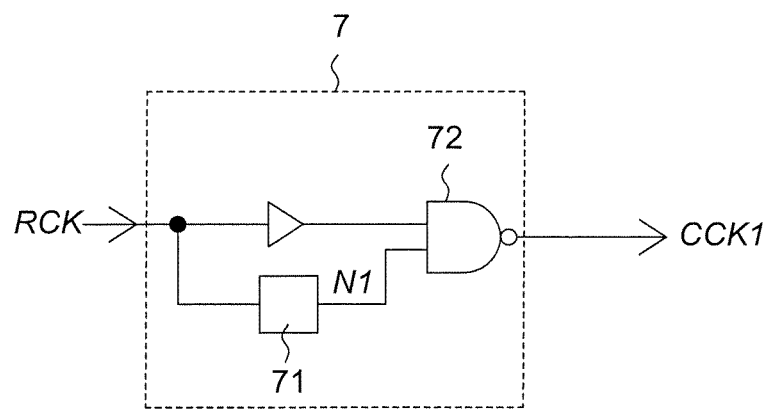
FIG. 17 is a diagram schematically showing a control clock generator according to still another embodiment of the present invention.
Figure 18:
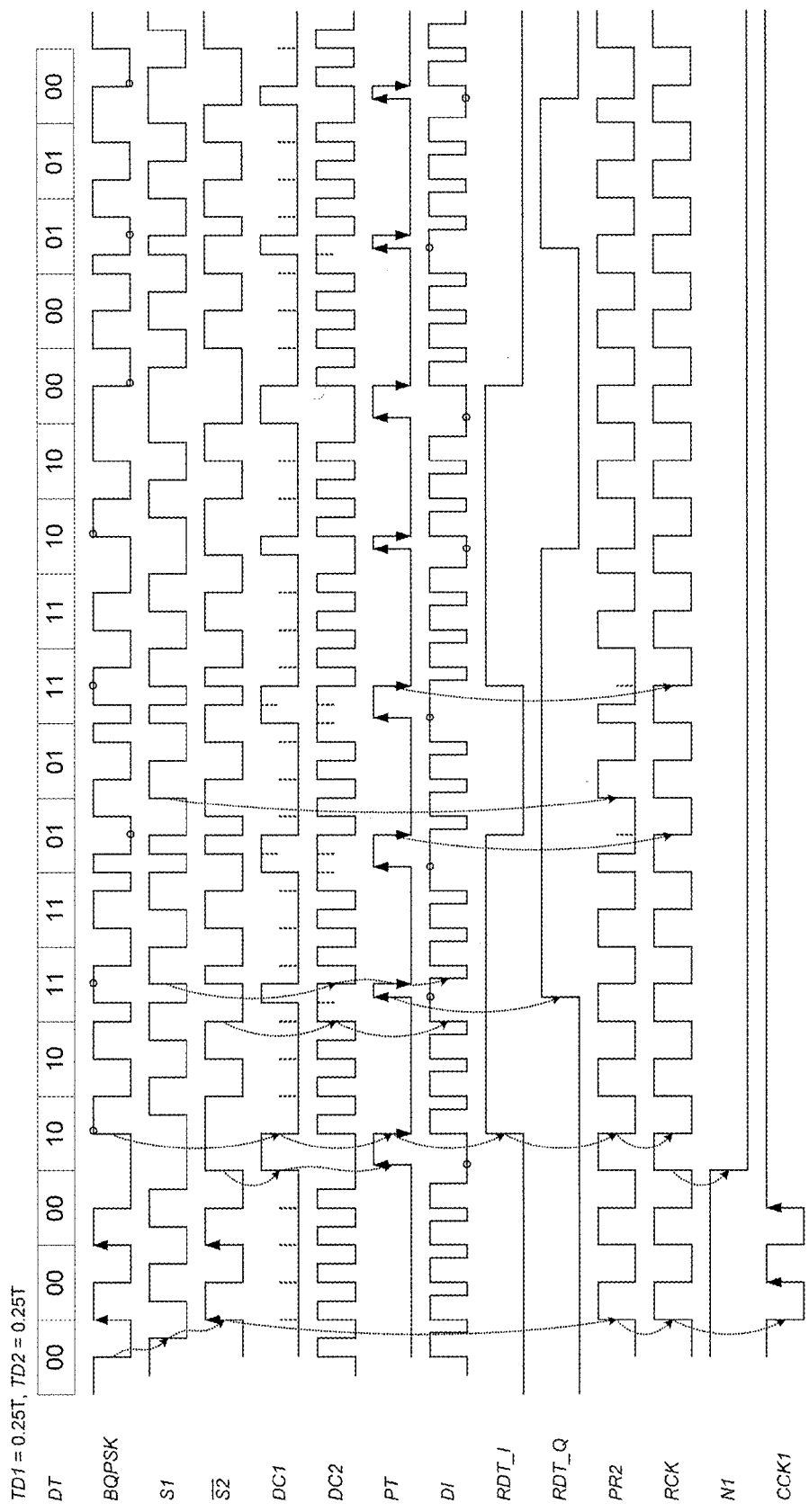
FIG. 18 is a diagram schematically showing the timing charts of a BQPSK demodulator according to still one embodiment of the present invention.
Figure 19:
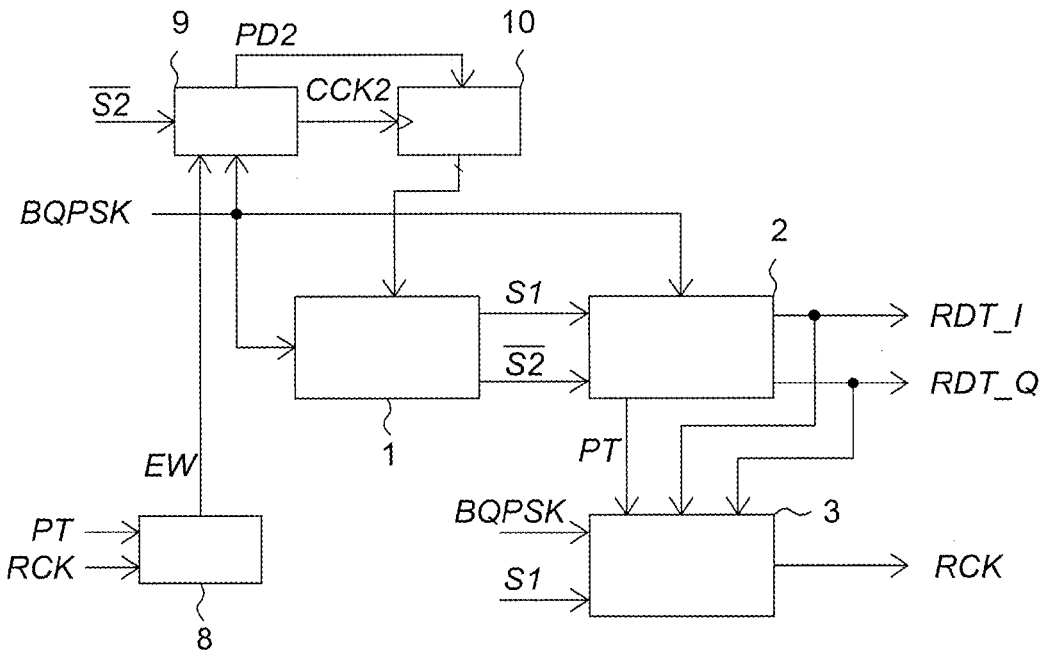
FIG. 19 is a diagram schematically showing a BQPSK demodulator according to a further embodiment of the present invention.
Figure 20:
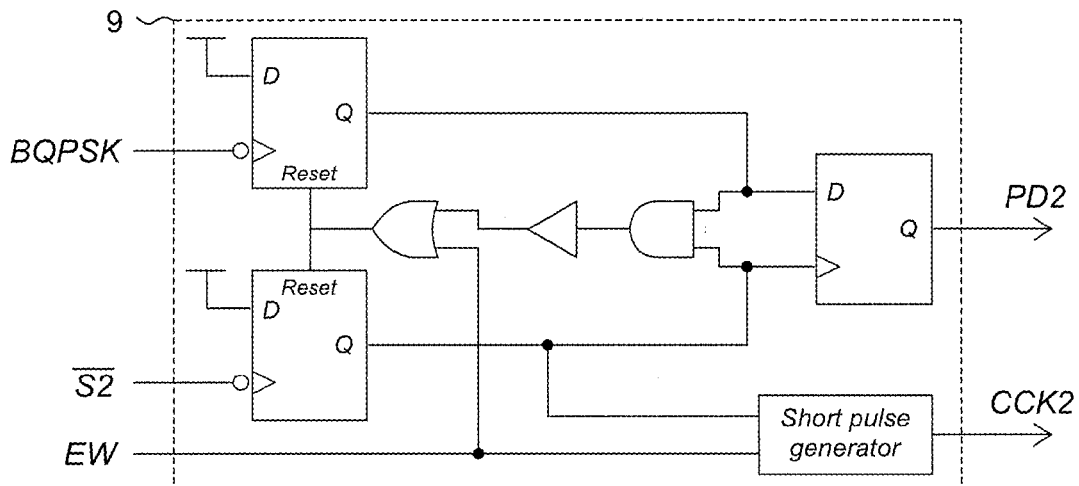
FIG. 20 is a diagram schematically showing an asynchronous phase detector according to a further embodiment of the present invention.
Figure 21:
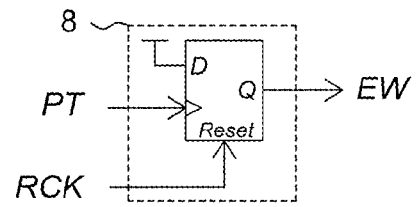
FIG. 21 is a diagram schematically showing an enabling window circuit phase detector according to a further embodiment of the present invention.
Figure 22:
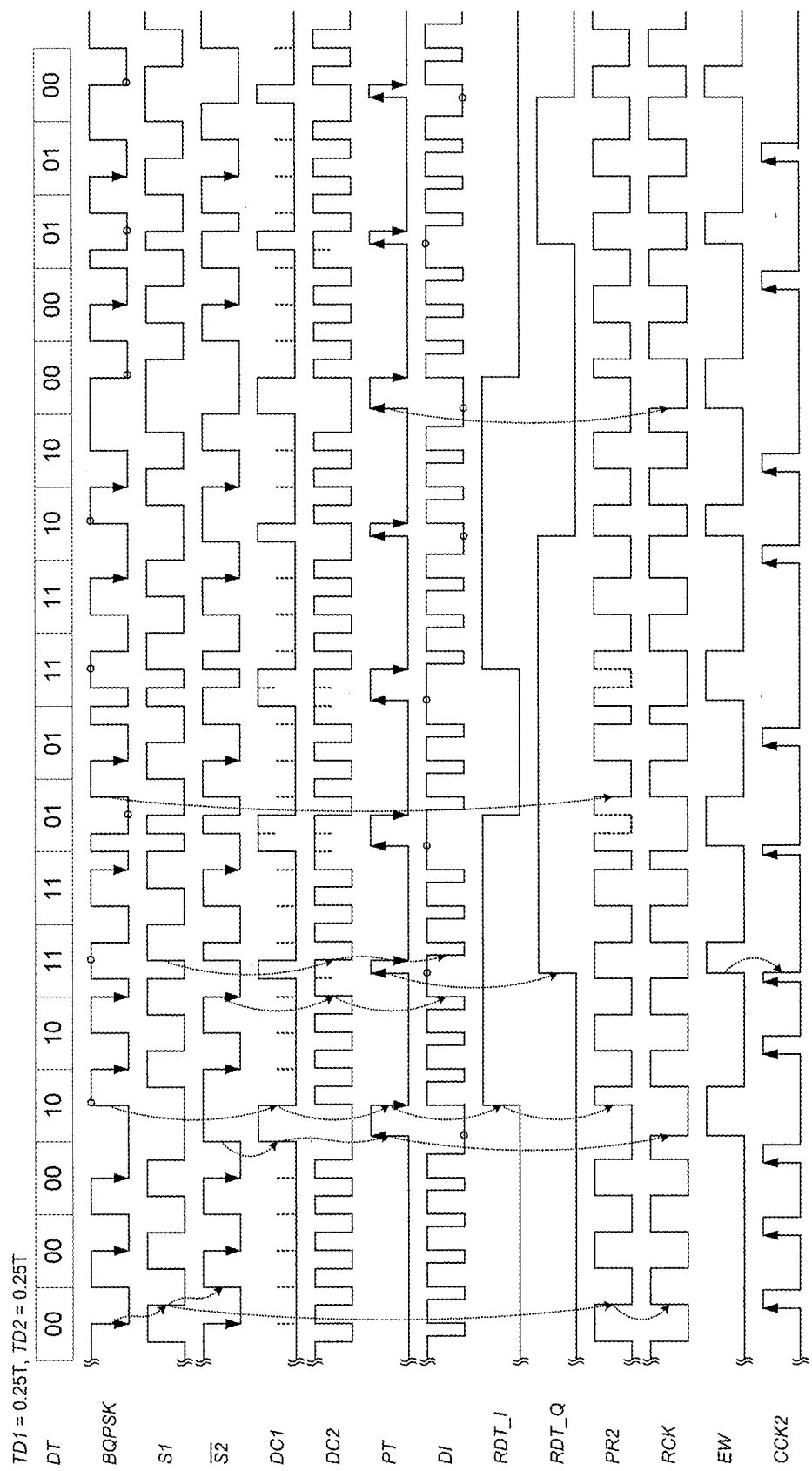
FIG. 22 is a diagram schematically showing the timing charts of a BQPSK demodulator according to a further embodiment of the present invention.

Refer to FIGS. 16-18. In one embodiment, the BQPSK demodulator of the present invention comprises a delay circuit 1, a decision-making circuit 2, a phase rotation circuit 3, a phase detector 5, a first controller 6, and a control clock generator 7. The connection and working principle of the delay circuit 1, the decision-making circuit 2 and the phase rotation circuit 3 in FIG. 16 has been described above and will not repeat herein. As shown in FIG. 17, the control clock generator 7 includes a second controller 71 and a NAND gate 72 and is used to output a control clock signal CCK1 to the first controller 6. The second controller 71 receives the recovery clock signal RCK and counts the periods of the recovery clock signal RCK. Once the periods count to N, the second controller 71 makes the first control signal N1 output therefrom be zero, as shown in the timing chart in FIG. 18. The NAND gate 72 is electrically connected with the second controller 71, receiving the first control signal N1 and the recovery clock signal RCK and undertaking a NAND operation to output a control clock signal CCK1 to the first controller 6. Therefore, the first controller 6 uses the front N-bit training sequence of the BQPSK signal to lock the delay circuit 1, wherein N is a natural number. Suppose that the tuning range of the first controller 6 is 5 bits and that a successive approximation method is adopted. The first controller 6 can complete locking within the time interval of at most 5 periods. After locking, DLL is closed. In one embodiment, the second controller 71 of the control clock generator 7 restores the delay circuit to an opened loop after N periods has elapsed, whereby to counteract the process variations. Refer to FIG. 16 and FIG. 18. The first controller 6 only undertakes locking in the beginning few periods and then enters a non-operation state. The operating principles of the other circuits have been described above and will not repeat herein.

In the embodiment shown in FIG. 16, the controller of DLL adopts a foreground calibration, wherein a small training sequence in the front region of the BQPSK signal is used to lock the delay circuit and acquire the correct delay time. In another embodiment, the controller of DLL adopts a background calibration, wherein after data transmission is started, DLL still keeps on locking the delay circuit, whereby to achieve a correct delay time. The details thereof will be further described thereinafter.

Refer to FIGS. 19-22. In one embodiment, the BQPSK demodulator of the present invention comprises a delay circuit 1, a decision-making circuit 2, a phase rotation circuit 3, an enabling window circuit 8, a asynchronous phase detector 9, and a third controller 10. The connection and working principle of the delay circuit 1, the decision-making circuit 2 and the phase rotation circuit 3 in FIG. 19 has been described above and will not repeat herein. The enabling window circuit 8 is electrically connected with the decision-making circuit 2 and the phase rotation circuit 3, outputting an enabling window signal EW according to the logic state of the phase transition signal PT. The asynchronous phase detector 9 is electrically connected with the enabling window circuit 8 and the delay circuit 1, outputting a second comparison signal PD2 and an asynchronous control clock signal CCK2 according to the logic state of the enabling window signal EW. The third controller 10 is electrically connected with the asynchronous phase detector 9 and the delay circuit 1, controlling the first delay time TD1 and the second delay time TD2 according to the second comparison signal PD2. After data transmission is started, the BQPSK demodulator of this embodiment still undertakes locking in the background method, whereby to counteract the delay variations caused by the process, voltage and temperature and enhance the reliability and performance of the demodulator.

It is easily understood: while a BQPSK signal shifts between different data, such as 10 •11 or 11 •01, it experiences a 90-degree phase change that the traditional phase detector is hard to detect. In the embodiment shown in FIG. 19, the enabling window circuit 8 and the asynchronous phase detector 9 are used to control the locking process. While the phase of a BQPSK signal changes, the third controller 10 is not allowed to change the control code lest incorrect locking occur. While there is no data transit, the asynchronous phase detector 9 keeps on tracking whether the BQPSK signal is aligned to the falling edge of the opposite-phase second delayed signal $\overline{S2}$, and locking is undertaken in the background.

In summary, the present invention at least has the following advantages:

1. Absolute stability: As the delay circuit is an open loop, the BQPSK demodulator is exempted from the problem of instability.

2. High data rate: As the circuit architecture has absolute stability, the data rate can achieve the maximum transmission rate of the BQPSK signal.

3. Low power consumption: Distinct from the conventional QPSK demodulator, the BQPSK demodulator of the present invention neither uses an A/D converter nor uses a quadrature oscillator, consuming much less power.

4. Simple circuit architecture: The BQPSK demodulator of the present invention features a simple circuit architecture and thus can be realized by digital circuits and analog circuits.

5. Low supply voltage: In a wireless power transmission system, the lower the supply voltage of the receiver, the longer the transmission distance, and the wider the application area. If the BQPSK demodulator is realized with digital circuits, the supply voltage can be decreased, and the dynamic power consumption and the static power consumption can be greatly lowered.

6. Smaller size: It is not necessary for the BQPSK demodulator of the present invention to use low-pass filters. Thus, fewer passive elements are used. Therefore, the BQPSK demodulator of the present invention has a smaller size.

7. Duty cycle 50%: The clock signal of the carrier wave output by the BQPSK demodulator of the present invention can be used by other circuits. For double edge triggered digital circuits, DRAM, etc., 50% duty cycle is very important.

8. Resistance to PVT (process, voltage, and temperature) variations: The delay circuit can be controlled by the delay-locked loop (DLL). While the delay circuit is locked, the present invention can counteract PVT variations and promote the reliability of the circuit.

In conclusion, the present invention proposes a BQPSK demodulator, which uses a delay circuit to delay a BQPSK signal and mixes the delayed BQPSK signal with the undelayed BQPSK signal to output a set of I-channel data signal and Q-channel data signal, and which further uses a phase rotation circuit to obtain a recovery clock signal according to the I-channel data signal and the Q-channel data signal. The delay circuit is an open loop, exempted from using extra complicated circuits to overcome the problem of instability. The circuit architecture of the present invention has absolute stability and can achieve a data rate as high as the maximum transmission rate of the BQPSK signal. The BQPSK demodulator of the present invention can greatly decrease power consumption and can be realized by digital circuits and analog circuits. Further, DLL, which undertakes locking in foreground or background, is able to counteract PVT variations and enhance circuit reliability.

What is claimed is:

1. A bowknot quadrature phase-shift keying demodulator comprising
    a delay circuit, receiving a bowknot quadrature phase-shift keying (BQPSK) signal, delaying said BQPSK signal by a first delay time to output a first delayed signal, and delaying said BQPSK signal by a total delay time to output a second delayed signal or an opposite-phase second delayed signal, wherein said opposite-phase second delayed signal is an opposite-signal of said second delayed signal; and
    a decision-making circuit, electrically connected with said delay circuit, mixing said BQPSK signal with said second delayed signal or said opposite-phase second delayed signal to generate a first heterodyne signal, sampling said BQPSK signal according to said first heterodyne signal to output an I-channel data signal of said BQPSK signal, mixing said first delayed signal with said BQPSK signal to generate a second heterodyne signal, and sampling said second heterodyne signal according to said first heterodyne signal to output a Q-channel data signal of said BQPSK signal, wherein said first delay time and said total delay time meets following relationships:
    $0.125T \leq TD1 \leq 0.375T$, $0.375T < TD < 0.625T$, $0.125T \leq TD - TD1 < 0.5T$, wherein TD is said total delay time, TD1 is said first delay time, and T is a period of a carrier wave of said BQPSK signal.

2. The bowknot quadrature phase-shift keying demodulator according to claim 1, wherein said decision-making circuit includes
    a first XOR gate, electrically connected with said delay circuit, and mixing said BQPSK signal with said second delayed signal to output said first heterodyne signal, wherein a Boolean function of said first heterodyne signal is expressed by $DC1 = BQPSK \oplus S2$, wherein DC1 is said first heterodyne signal, BQPSK is said BQPSK signal, and S2 is said second delayed signal;
    a second XOR gate, electrically connected with said delay circuit, mixing said BQPSK signal with said first delayed signal to output said second heterodyne signal, wherein a Boolean function of said second heterodyne signal is expressed by $DC2 = BQPSK \oplus S1$, wherein DC2 is said second heterodyne signal, BQPSK is said BQPSK signal, and S1 is said first delayed signal;
    a first flip-flop, electrically connected with said first XOR gate, and sampling said BQPSK signal according to rising edges of said first heterodyne signal to output said I-channel data signal of said BQPSK signal; and
    a second flip-flop, electrically connected with said first XOR gate and said second XOR gate, and sampling said second heterodyne signal according to falling edges of said first heterodyne signal to output said Q-channel data signal of said BQPSK signal.

3. The bowknot quadrature phase-shift keying demodulator according to claim 2, wherein said decision-making circuit further includes
    a first hazard-remover, interposed between and cascaded with said first XOR gate and said first flip-flop, eliminating hazards of said first heterodyne signal, and outputting a phase transition signal, wherein said first flip-flop samples said BQPSK signal according to rising edges of said phase transition signal; and
    a second hazard-remover, interposed between and cascaded with said second XOR gate and said second flip-flop, eliminating hazards of said second heterodyne signal, and outputting a data information signal, wherein said second flip-flop samples said data information signal according to falling edges of said phase transition signal.

4. The bowknot quadrature phase-shift keying demodulator according to claim 1, wherein said decision-making circuit includes
    a first XOR gate, electrically connected with said delay circuit, and mixing said BQPSK signal with said opposite-phase second delayed signal to output said first heterodyne signal, wherein a Boolean function of said third heterodyne signal is expressed by $DC1 = BQPSK \oplus \overline{S2}$, and wherein DC1 is said first heterodyne signal, BQPSK is said BQPSK signal, and $\overline{S2}$ is said second opposite-phase delayed signal, and wherein said opposite-phase second delayed signal is an opposite-signal of said second delayed signal;
    a second XOR gate, electrically connected with said delay circuit, mixing said BQPSK signal with said first delayed signal to output said second heterodyne signal, wherein a Boolean function of said second heterodyne signal is expressed by $DC2 = BQPSK \oplus S1$, wherein DC2 is said second heterodyne signal, BQPSK is said BQPSK signal, and S1 is said first delayed signal;
    a first flip-flop, electrically connected with said first XOR gate, and sampling said BQPSK signal according to falling edges of said first heterodyne signal to output said I-channel data signal of said BQPSK signal; and
    a second flip-flop, electrically connected with said first XOR gate and said second XOR gate, and sampling said second heterodyne signal according to rising edges of said first heterodyne signal to output said Q-channel data signal of said BQPSK signal.

5. The bowknot quadrature phase-shift keying demodulator according to claim 4, wherein said decision-making circuit further includes a first hazard-remover, interposed between and cascaded to said first XOR gate and said first flip-flop, and eliminating hazards of said first heterodyne signal to output a phase transition signal, wherein said first flip-flop samples said BQPSK signal according to falling edges of said phase transition signal; and a second hazard-remover, interposed between and cascaded to said second XOR gate and said second flip-flop, and eliminating hazards of said second heterodyne signal to output a data information signal, wherein said second flip-flop samples said data information signal according to rising edges of said phase transition signal.

6. The bowknot quadrature phase-shift keying demodulator according to claim 1, wherein said first delay time and said total delay time is locked by a delay-locked loop.

7. The bowknot quadrature phase-shift keying demodulator according to claim 6, wherein said delay circuit functions as a delay line of said delay-locked loop.

8. The bowknot quadrature phase-shift keying demodulator according to claim 6, wherein said delay-locked loop includes
a phase detector detecting a phase difference between said BQPSK signal and said second delayed signal and outputting a comparison signal; and
a first controller, electrically connected with said phase detector and said delay circuit, and controlling said first delay time and said total delay time according to said comparison signal.

9. The bowknot quadrature phase-shift keying demodulator according to claim 6, wherein said delay-locked loop includes
a control clock generator, electrically connected with said first controller and further including
a second controller, receiving said recovery clock signal and outputting a first control signal; and
a NAND gate, electrically connected with said second controller, receiving said first control signal and said recovery clock signal to undertake an NAND operation and output a control clock signal to said first controller.

10. The bowknot quadrature phase-shift keying demodulator according to claim 1 further comprising
a phase rotation circuit, electrically connected with said delay circuit and said decision-making circuit, and processing at least two of said first delayed signal, said second delayed signal and said BQPSK signal according to said I-channel data signal and said Q-channel data signal, which are output by said decision-making circuit, to output a phase clock signal functioning as a recovery clock signal.

11. The bowknot quadrature phase-shift keying demodulator according to claim 10, wherein said first delay time and said second delay time satisfy following relationships:
0.125T≤TD1≤0.375T, 0.375T<TD<0.625T, and 0.125T≤TD−TD1<0.5T, wherein TD is said total delay time, TD1 is said first delay time, and T is a period of a carrier wave of said BQPSK signal.

12. The bowknot quadrature phase-shift keying demodulator according to claim 10, wherein said phase rotation circuit includes
a third XOR gate, electrically connected with said decision-making circuit, receiving said I-channel data signal and said Q-channel data signal, and undertaking an XOR operation to output a phase control signal;
a first multiplexer, electrically connected with said delay circuit and said decision-making circuit, and processing said first delayed signal or said second delayed signal, which is output by said delay circuit to output a first procession signal according to a logic state of said Q-channel data signal, which is output by said decision-making circuit; and a second multiplexer, electrically connected with said third XOR gate and said first multiplexer, reversing a phase of said first procession signal output by said first multiplexer to output a second procession signal according to said phase control signal output by said third XOR gate, wherein said second procession signal functions as said phase clock signal, and wherein a Boolean function of said phase rotation circuit is expressed by $$RCK = \overline{(S2 \cdot \overline{RDT\_Q} + S1 \cdot RDT\_Q) \oplus (RDT\_I \oplus RDT\_Q)}$$

wherein RCK is said phase clock signal, S2 is said second delayed signal, $\overline{RDT\_Q}$ is an opposite-phase signal of said Q-channel data signal, S1 is said first delayed signal, RDT_Q is said Q-channel data signal, and RDT_I is said I-channel data signal.

13. The bowknot quadrature phase-shift keying demodulator according to claim 12, wherein said phase rotation circuit further includes
an OR gate, electrically connected with said second multiplexer and said decision-making circuit, receiving said second procession signal and said first heterodyne signal, and undertaking an OR operation to output said phase clock signal, wherein a Boolean function of said phase rotation circuit is expressed by $$RCK = \overline{(S2 \cdot \overline{RDT\_Q} + S1 \cdot RDT\_Q) \oplus (RDT\_I \oplus RDT\_Q)} + DC1$$

wherein RCK is said phase clock signal, S2 is said second delayed signal, $\overline{RDT\_Q}$ is an opposite-phase signal of said o-channel data signal, S1 is said first delayed signal, RDT_Q is said Q-channel data signal, RDT_I is said I-channel data signal, and DC1 is said first heterodyne signal.

14. The bowknot quadrature phase-shift keying demodulator according to claim 10, wherein said phase rotation circuit includes
a third XOR gate, electrically connected with said decision-making circuit, receiving said I-channel data signal and said Q-channel data signal, and undertaking an XOR operation to output a phase control signal;
a first multiplexer, electrically connected with said delay circuit and said decision-making circuit, and processing said BQPSK signal or said first delayed signal output by said delay circuit to output a first procession signal according to a logic state of said Q-channel data signal output by said decision-making circuit;
a second multiplexer, electrically connected with said third XOR gate and said first multiplexer, reversing a phase of said first procession signal output by said first multiplexer to output a second procession signal according to said phase control signal output by said third XOR gate; and
a NOR gate, electrically connected with said second multiplexer and said decision-making circuit, receiving said second procession signal and said first heterodyne signal, and undertaking a NOR operation to output said phase clock signal, wherein a Boolean function of said phase rotation circuit is expressed by $$RCK = \overline{[(S1 \cdot \overline{RDT\_Q} + BQPSK \cdot RDT\_Q) \oplus (RDT\_I \oplus RDT\_Q)] + DC1}$$

wherein RCK is said phase clock signal, S1 is said first delayed signal, $\overline{RDT\_Q}$ is an opposite-phase signal of said O-channel data signal, BQPSK is said BQPSK signal, RDT_Q is said Q-channel data signal, RDT_I is said I-channel data signal, and DC1 is said first heterodyne signal.

15. The bowknot quadrature phase-shift keying demodulator according to claim 10 further comprising
  a third hazard-remover, cascaded to an output terminal of said phase rotation circuit and eliminating hazards of said phase clock signal to output said recovery clock signal.

16. The bowknot quadrature phase-shift keying demodulator according to claim 10, wherein said first delay time and said total delay time is locked by a delay-locked loop.

17. The bowknot quadrature phase-shift keying demodulator according to claim 16, wherein said delay circuit functions as a delay line of said delay-locked loop.

18. The bowknot quadrature phase-shift keying demodulator according to claim 17, wherein said decision-making circuit further includes a first hazard-remover eliminating hazards of said first heterodyne signal to output a phase transition signal, and wherein said delay-locked loop includes
  an enabling window circuit, electrically connected with said decision-making circuit and said phase rotation circuit, and outputting an enabling window signal according to a logic state of said phase transition signal;
  an asynchronous phase detector, electrically connected with said enabling window circuit and said delay circuit, and outputting a second comparison signal and an asynchronous control clock signal according to a logic state of said enabling window signal; and
  a third controller, electrically connected with said asynchronous phase detector and said delay circuit, and controlling said first delay time and said total delay time according to said second comparison signal.

* * * * *